Feb. 4, 1941. — B. L. HENRY — 2,230,896
SEAM AND METHOD OF FORMING SEAMS
Filed April 20, 1936 — 8 Sheets-Sheet 1

INVENTOR
BEULAH LOUISE HENRY
BY William F. Feuger
ATTORNEY

Feb. 4, 1941.  B. L. HENRY  2,230,896
SEAM AND METHOD OF FORMING SEAMS
Filed April 20, 1936   8 Sheets-Sheet 2
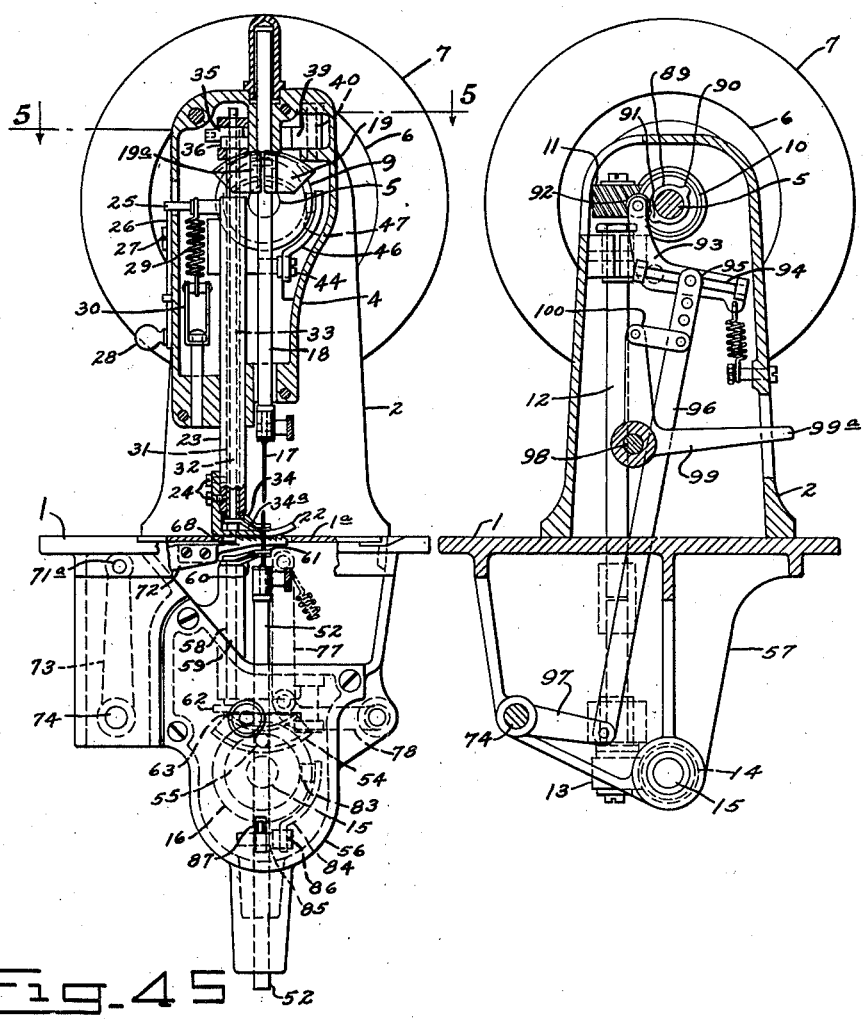
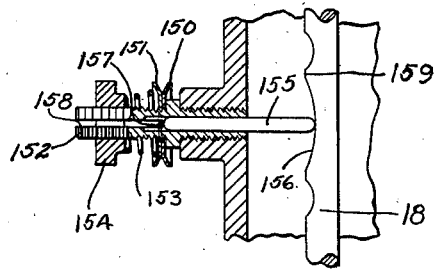
INVENTOR
BEULAH LOUISE HENRY
BY William F. Feyrer
ATTORNEY

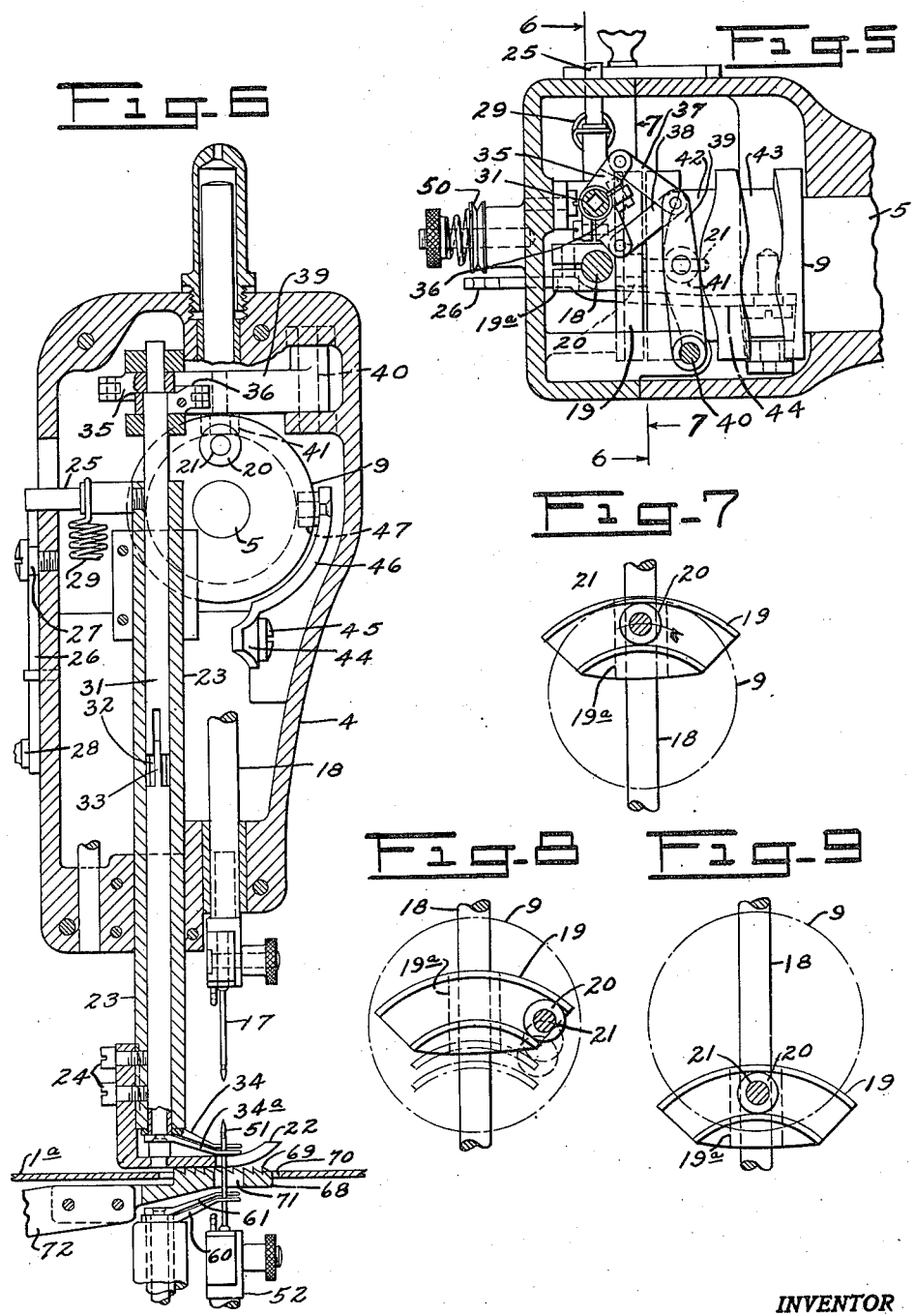

Feb. 4, 1941.   B. L. HENRY   2,230,896
SEAM AND METHOD OF FORMING SEAMS
Filed April 20, 1936   8 Sheets-Sheet 4
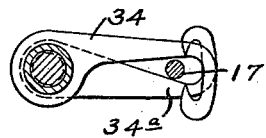
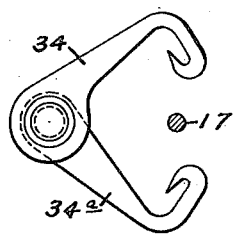
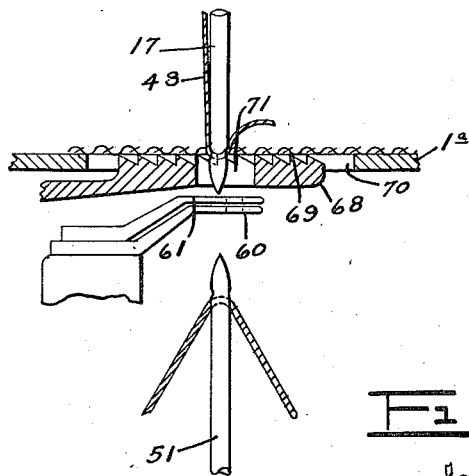
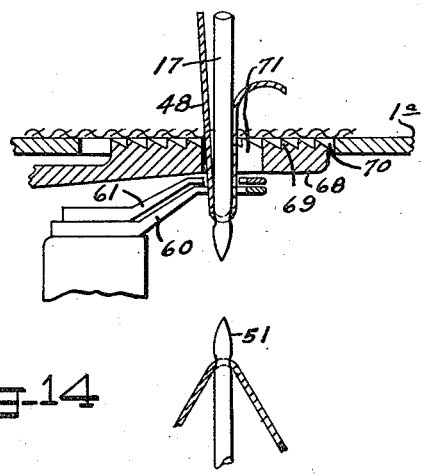
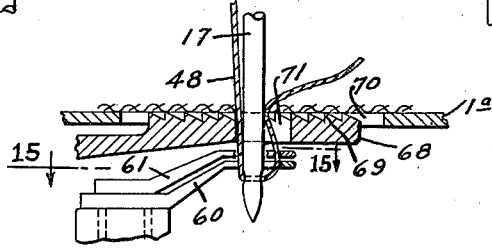
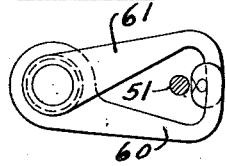
INVENTOR
BEULAH LOUISE HENRY
BY William F. Feyrer
ATTORNEY

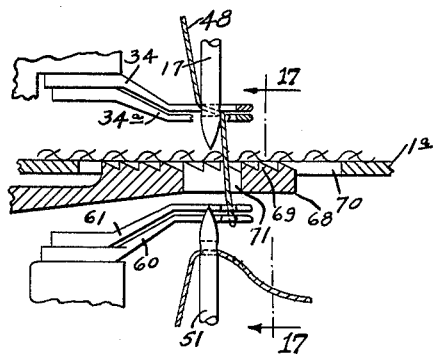
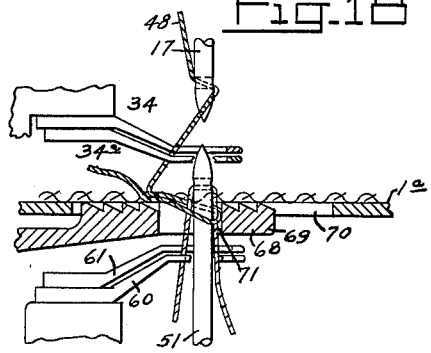
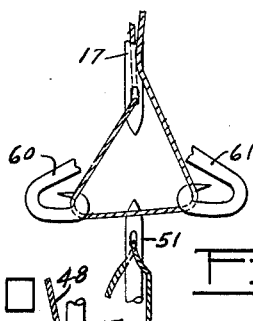
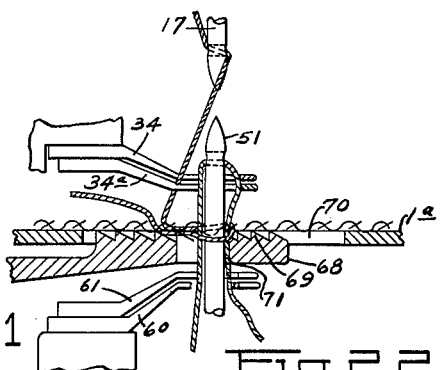
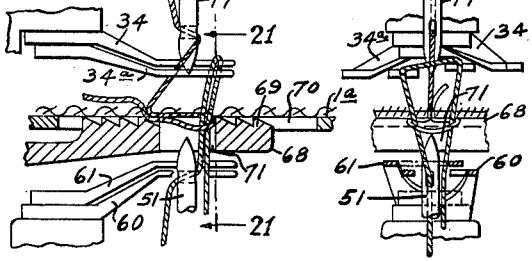
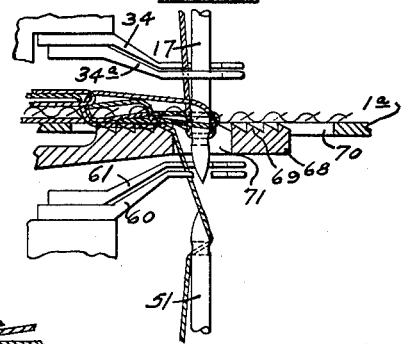
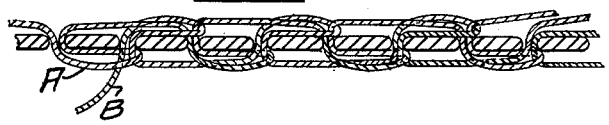

Feb. 4, 1941. B. L. HENRY 2,230,896
SEAM AND METHOD OF FORMING SEAMS
Filed April 20, 1936 8 Sheets-Sheet 6
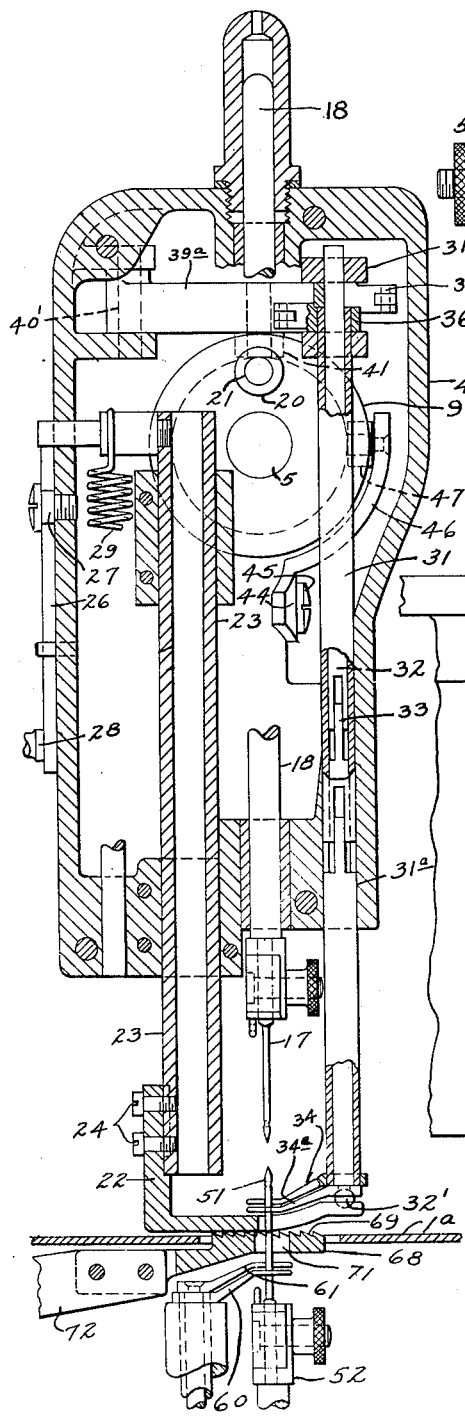
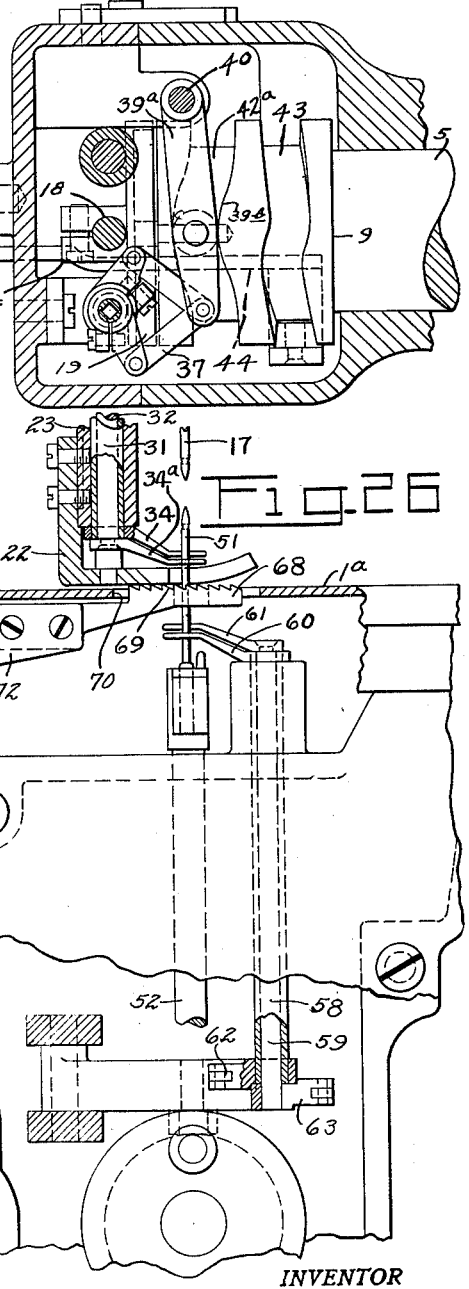
INVENTOR
BEULAH LOUISE HENRY
BY William T. Feuyrer
ATTORNEY

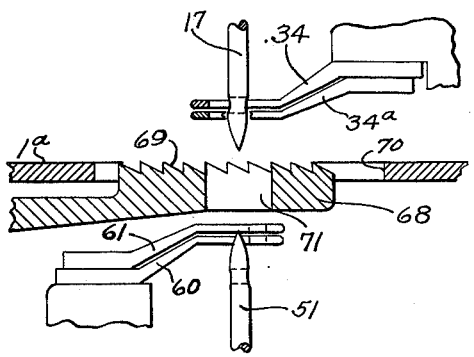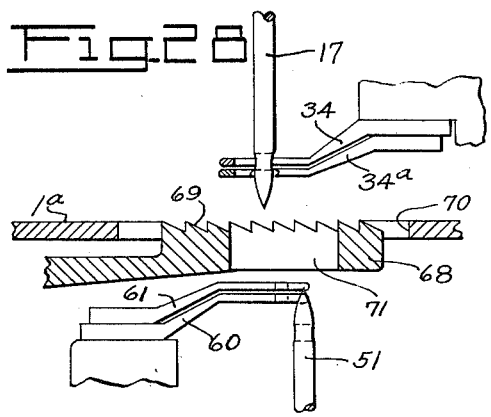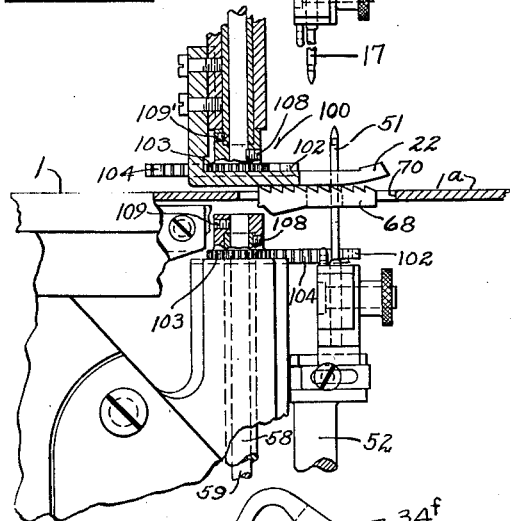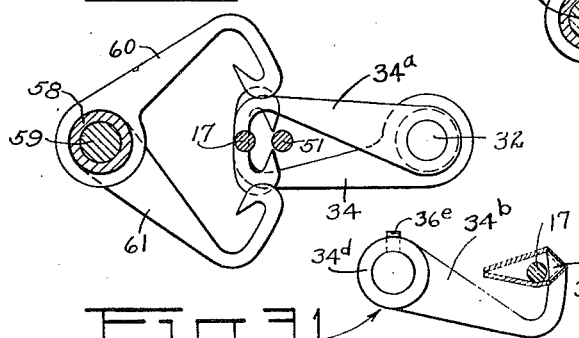

Feb. 4, 1941. B. L. HENRY 2,230,896
SEAM AND METHOD OF FORMING SEAMS
Filed April 20, 1936 8 Sheets-Sheet 8
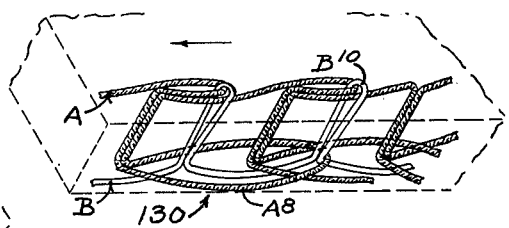
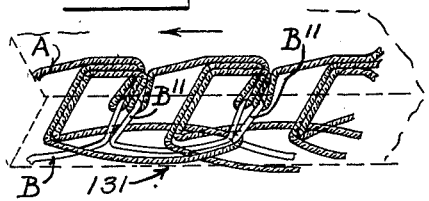
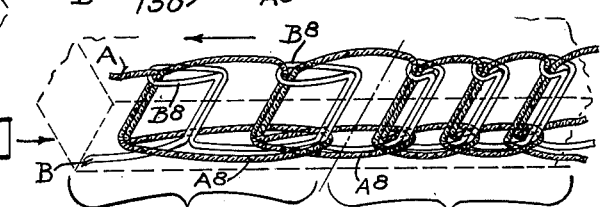
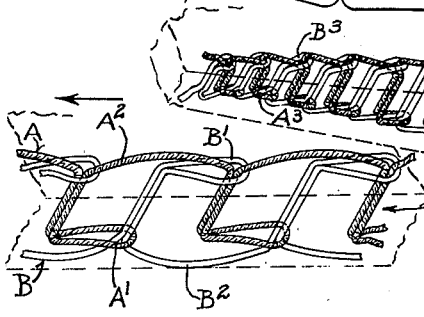
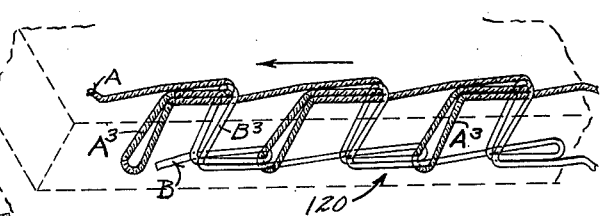
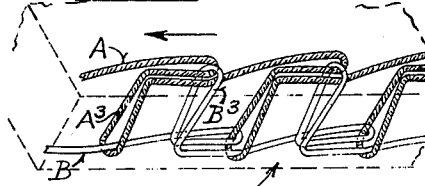
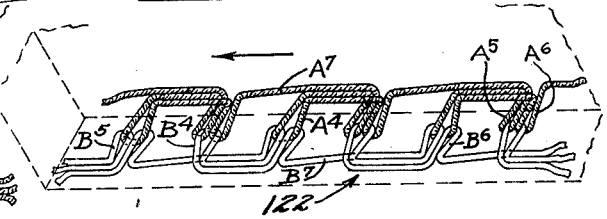
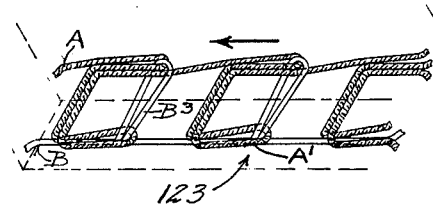
INVENTOR
BEULAH LOUISE HENRY
BY
ATTORNEY Patented Feb. 4, 1941

2,230,896

UNITED STATES PATENT OFFICE 2,230,896

SEAM AND METHOD OF FORMING SEAMS

Beulah Louise Henry, New York, N. Y.

Application April 20, 1936, Serial No. 75,432

4 Claims. (Cl. 112—262)

This invention relates to new and useful improvements in seams and methods of forming seams, which invention is fully set forth in the following specification.

This application contains matter derived from and is a continuation in part of my copending application Ser. No. 748,913, filed October 18, 1934, which resulted in Patent 2,037,901 on April 21, 1936, and reissue application Ser. No. 85,919 thereon, filed June 18, 1936, which resulted in Reissue Patent 21,645 on December 3, 1940.

In the sewing machine art many rather intangible but nevertheless important factors prevail. For example, it is highly desirable to provide forms of stitches which are simple and sturdy so that they will serve to hold parts of a garment or the like together efficiently and yet, because of the thousands of stitches that may be made in a single garment, be made on comparatively simple and high speed sewing apparatus.

In meeting these objectives many of the previous proposals disclosed stitches made with but a single thread. However, most of these had the disadvantage of ravelling very easily, and consequently failed to hold parts of a garment or the like together efficiently. In those few efforts where an attempt was made to lock the individual or alernate stitches of a single thread seam rather complicated loop- and thread-handling mechanisms were required.

Some of the proposals in the past to obviate these disadvantages included the disclosure of stitches employing two continuous threads. However, when these two continuous threads were in the form of a surface intertwined seam structure there was considerable likelihood of ravelling or the seam quickly took on a ravelled appearance. Also, in most of these two-thread seam proposals the seam had a different appearance on the two sides of the article which was undesirable in many instances.

It is an important object of the present invention to provide the more advantageous two-thread type of seam, and to provide a seam which may have the same appearance on both sides of the material.

It is a further important object to provide a double-thread seam which may be thoroughly locked together, so that there is no danger of ravelling.

In many of the previously proposed stitches and seams special types of thread were required; viz., it was necessary to use so-called right- or left-hand thread and to use hard or soft finished thread, because of the peculiar whip given to a thread during functioning of the thread-casting and stitch-forming instrumentalities. It is an object of the present invention to provide a seam and method of forming the same in which special threads need not be used.

The most satisfactory seam for many types of work wherein it is desired to have a seam which will not ravel is a so-called lock stitch, having cooperating upwardly and downwardly extending concatenations joined within the thickness of the material. While this type of stitch is very satisfactory in many kinds of work it is not flexible or yielding and consequently cannot be employed where these characteristics are desired in a garment or the like.

It is a very important object of the present invention to provide a seam in which the stitches will be locked together substantially so as to prevent ravelling, yet which will be resilient and yielding.

Features flowing from the attainment of this objective include a novel stitch having loops projected entirely through the material and with the concatenations thereof laid upon the material in a novel manner, in one form; and with the concatenations thereof drawn tautly down into the material in a modified form. A further feature includes the provision of a seam wherein the loops are laid upon the material, at opposite sides thereof, in reverse or opposed directions to provide an exceptionally resilient and yielding type of seam. In some types of work it is desirable to have a seam capable of at least a short amount of longitudinal elongation and the seam of the present invention with loops extending along both faces of the material, in either uniform or opposed direction, has this characteristic. It does this without undue looseness and opening of the seam structure because of the inherent looseness which may be built into the stitch formation.

In most forms of seam, heretofore proposed, it was necessary to use thick unsightly threads in order to provide a strong seam.

It is an object of the present invention to provide a seam which is very strong even though made of thin and sightly thread.

It is a further object of the present invention to provide a seam which will not grin, or spread apart.

This is accomplished, with the present invention, through the provision of a stitch employing more thread than usual in its stitch formation in a given length of work, so that the strain and pressure on the seam is better taken up. This therefore results in a stronger seam even though thin thread is used. In some types of work it is desirable to have different effects on opposite sides of the work for ornamental purposes. This desideratum is accomplished, according to the present invention, by providing a seam the appearance of which may be changed very easily by merely changing tensions and extent of feed of thread to the point of stitching.

Many of the seams heretofore proposed could be made only on the material; that is to say, the stitches could not be formed by the stitching instrumentalities after the aricle or maerial was clear of the needle without tangling or breaking the thread.

It is an important object of the present invention to provide a seam, especially one capable of interlocking substantially, which may be made on or off the material.

In many classes of work now produced in the so-called needle industries it is desirable to have gang or multiple seam effects, for strength, ornamental, or other purposes and effects. However, such effects are not possible with many of the seams heretofore proposed since the necessary use of shuttles, bobbins, or the like prevented the same. It is an important object of the present invention to provide a seam in which it is possible to obtain close gang or multiple effects.

A feature resulting from the accomplishment of this object includes the provision of a seam in which the use of bulky shuttles, bobbins, or the like are eliminated entirely, and whereby it is possible to employ closely spaced needles and obtain a plurality of closely spaced seams.

While many of the seams heretofore proposed were very satisfactory on certain types of work they had but very limited application; viz., if satisfactory on thick materials were often totally unsatisfactory on thin materials. Likewise, seams satisfactory on unyielding materials were totally unsatisfactory on resilient, elastic, or yielding materials. This factor also holds in connection with some forms of seams satisfactory for close-mesh materials but unsatisfactory for open-mesh materials.

It is one of the important objects of the present invention to provide a seam which is satisfactory for these divers conditions, and which will work equally satisfactorily with each.

My improved stitch, made with two continuous threads, is substantially locked against ravelling from either end. That is to say, the stitch cannot be ravelled back from the beginning end of the stitch line, neither can it be ravelled from the finished end of the line of stitches. The stitch is locked securely at each and every stitch, and by regulating the tensions on both threads, the loops or concatenations of the stitch may be drawn well into the material, if the material be thick enough to hide the loops in a way similar to or like the well known lockstitch. The amount of tension employed to accomplish a well drawn-in stitch is much less than that required in other lockstitch machines, because only a small amount of thread is drawn off by the stitch forming instrumentalities, whereas in other lockstitch machines, even with a medium sized bobbin, holding about 80 yards of #80 thread, 2⅞" of thread must be drawn back and forth through the eye of the needle at each stitch formation. This is entirely done away with in the making of my improved stitch, because the loopers draw off only sufficient thread for the stitch formation, and as a result of this, my improved stitches can be made with most delicate threads. The thread is not weakened by see-sawing action through the eye of the needle, and as a result, the well formed stitches retain full strength of the sewing threads.

My improved stitch has advantage over other stitches made by continuous threads in that each stitch is locked securely against ravelling and the stitch lies flat against the material on each side, and has the same appearance on top and bottom.

In most of the lock-stitch machines heretofore proposed it was necessary to use thread takeups or thread controls in the apparatus used to produce the same. If preferred such instrumentalities may be eliminated entirely from the apparatus of the present invention, and satisfactory stitches obtained. However, where the machine is changed often and where it is desired to obtain divers seam effects thread-feeding and tensioning means may be provided.

Also, in many of the so-called lock-stitch machines heretofore provided the various parts of the stitching instrumentalities were operated at different speeds. Consequently costly noisy speed changing mechanism was required, and necessitated using many more operating parts in the machine.

The seams of the present invention may be made with a stitching mechanism in which the various parts operate at the same speed thus making possible a simple, quiet, efficient and economical unit, and dispensing with the need of two-to-one and three-to-one hooks and bobbins.

The method has been developed particularly for the rapid and efficient production of a satisfactory seam.

The article has been designed particularly to provide a stronger and more satisfactory joint or seam with the employment of but a single seam, although multiple seams may also be used.

Other objects, features, and advantages will appear hereafter.

In the drawings, which illustrate the present preferred embodiments of the invention:

Figure 3 is a sectional view taken on the line 3—3 of Figure 2 looking in the direction of the arrows;

Figure 4 is a sectional view taken on the line 4—4 of Figure 2 and looking in the direction of the arrows;

Figure 5 is a sectional view taken on the line 5—5 of Figure 3;

Figure 6 is an enlarged sectional view of the upper portion of the machine, taken on the line 6—6 of Figure 5 looking in the direction of the arrows;

Figure 1:
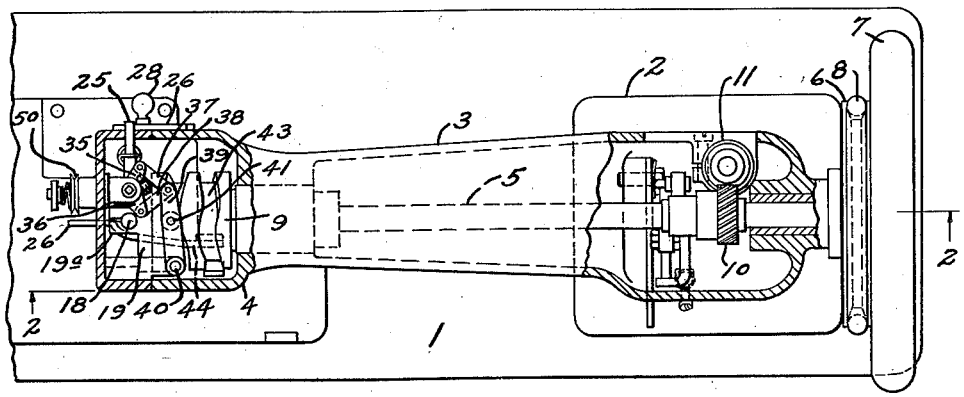
Figure 1 is a top plan view of the machine with parts of the cover broken away so that the interior mechanism may be seen.

Figures 7, 8, and 9 are detail views taken along the line 7—7 of Figure 5 looking in the direction of the arrows;

Figure 10 is a detail plan view of the upper loop hooks forming part of the mechanism of the machine and showing said hooks in their closed position with respect to the needle;

Figure 11 is a view similar to Figure 10 but indicating said loop hooks in open position;

Figure 12 is a detail sectional view showing the positions of the upper and lower needles of the machine at the start of their reciprocating movements in forming the stitch;

Figure 13 is a view similar to Figure 12 but showing the upper needle in a more advanced descending position;

Figure 14 is a view similar to Figure 13 showing the upper needle as it has completed its descending movement and the lower loop hooks as they are starting their opening movement;

Figure 15 is a plan view of the loop hooks as they appear in Figure 14, said view being taken on the line 15—15 of Figure 14, looking in the direction of the arrows;

Figure 16 is a view showing the next step in the formation of the stitch and at the time when the upper needle has started to withdraw upwardly from the work and the lower needle has commenced to move upwardly;

Figure 17 is a view of the lower loop hooks taken on the line 17—17 of Figure 16 looking in the direction of the arrows;

Figure 18 is a view showing the next step in the formation of the stitch and indicating the lower needle further advanced upwardly and the upper needle at the time it has about completed its upward movement;

Figure 19 is a view showing the lower needle at the time it has completed its upward movement;

Figure 20 is a view showing the lower needle after it has started on its downward movement and the upper needle again descending;

Figure 21 is a view taken on the line 21—21 of Figure 20 looking in the direction of the arrows;

Figure 22 is a view showing the needles at the time when the lower needle has completed its downward movement;

Figure 23 is an enlarged diagrammatic view indicating the manner in which the stitch is formed by the reciprocating needle;

Figure 24 is a sectional view similar to Figure 6 but shows a modified form of loop-control mechanism.

Figure 25 is a sectional view similar to Figure 5 of the modified control shown in Figure 24;

Figure 26 is a sectional view showing the lower hooks rotatively mounted at the front of the needle;

Figure 27 is an enlarged fragmentary view of the upper and lower hooks shown in Figure 24;

Figure 28 is an enlarged view similar to Figure 27 with the needles and hooks offset relatively to each other;

Figure 29 is a fragmentary top plan showing of the hooks in Figure 27;

Figure 30 is a view similar to Figure 29 but shows these parts arranged for the offset needles of Figure 28;

Figure 31 is a fragmentary top view showing the simplest and preferred form of hook provided by the present invention;

Figure 32 is a fragmentary view partly in section of a modified form of hook-operating mechanism and stitching mechanism;

Figure 33 is a fragmentary top view of the upper hook-controlling mechanism shown in Figure 32;

Figure 34 is a fragmentary view, similar to Figure 33, of the lower hook-controlling mechanism disclosed in Figure 32;

Figure 35 is an enlarged perspective view of the hook shown in Figures 32 and 34;

Figure 36 is a perspective showing of a modified form of seam in accordance with the present invention, tightly drawn;

Figure 37 is a view of the seam shown in Figure 36 with the loop drawn into the material;

Figure 38 is a perspective view of the preferred form of seam shown in Figure 23, tightly drawn onto the surface of the material;

Figure 39 is a perspective view similar to Figures 23 and 38, with the loops loose on the surface of the material;

Figure 40 is a view similar to Figure 38 but shows the loops on opposite sides of the material cast in opposite directions;

Figure 41 is a perspective view of the seam shown in Figures 23 and 38 but with the surface loops drawn over to the point of projection through the material;

Figure 42 is a view like Figures 23, 38, and 41, but shows the surface threads in a somewhat loose condition;

Figure 43 is a view similar to Figures 38 through 42 inclusive, but shows the normal surface loops drawn down into the material to more securely lock the stitch;

Figure 44 is a view similar to Figure 43 but shows the double-thread seam of the present invention with thrown-back loops to form substantially a four-thread seam with two threads, in an interlocked manner; and Figure 45 is a detail view of the automatic tension control.

Like numerals of reference in the several figures indicate the same parts.

The apparatus herein disclosed is more completely disclosed and claimed in my copending application Serial No. 85,919, filed June 18, 1936, which is a reissue of my Patent No. 2,037,901, granted April 21, 1936; and in my copending continuation-in-part application Serial No. 191,806, filed February 21, 1938.

Before describing the novel and advantageous seams and the advantageous methods for the production thereof provided by the present invention, the present preferred apparatus for making the seam and for carrying out the method, will be first described.

The sewing machine of my invention as illustrated in the drawings comprises a bed plate 1 formed with a needle plate 1a and having a casing 2 rising therefrom provided with a laterally extending hollow arm 3 terminating in a head portion 4. Below the bed plate there is provided the downwardly extending support 57 connected with the hollow casing 56 which encloses certain of the mechanism located at the lower portion of the machine below the bed plate 1.

The hollow arm 3 is provided with suitable bearings for supporting the main drive shaft 5 of the machine. The drive shaft 5 is provided with a driving pulley 6 and the hand wheel 7. The driving pulley and hand wheel may be connected with the drive shaft in any suitable manner and the driving pulley may be driven either by a belt indicated at 8, or by any other suitable or usual driving means.

Figure 2:
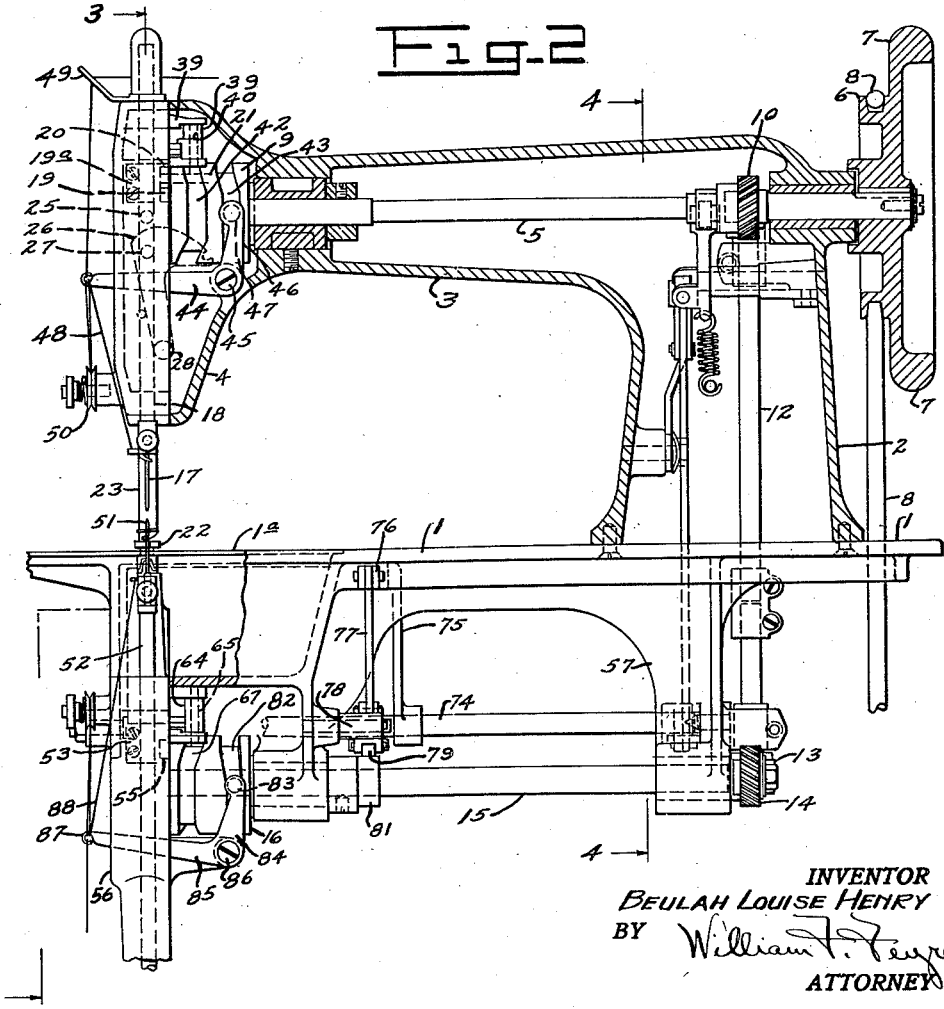
Figure 2 is a side elevational and sectional view of the machine taken on the line 2—2 of Figure 1 and looking in the direction of the arrows.

Referring to Figures 1 and 2, the main drive shaft 5 is shown as provided at its left hand end with the cam member 9. The other end of the main drive shaft has mounted thereon a gear 10 which is positioned so that it will mesh with a gear 11 mounted on the upper end of a vertical shaft 12. The shaft 12 at its lower end is provided with a gear 13 (see Figure 4) which is positioned so that it will mesh with a gear 14 secured to the right hand end of horizontal shaft 15 located at the lower portion of the machine. The left hand end of shaft 15 has mounted thereon a cam member 16 which is identical in size and construction with the upper cam member 9 which is secured to the main drive shaft 5.

It will be evident from the above description of the arrangement of the several shafts that when a rotary movement is imparted to the main drive shaft 5 said shaft through its gear 10 will impart a similar rotary movement to the lower horizontal shaft 15 through the vertical shaft 12.

The stitch forming machine of the present invention, in its present preferred form, employs an upper and lower needle which are caused to have an alternate movement in timed relation with each other in effecting the formation of the stitch. The mechanism for effecting the movements of the upper needle and its associated and cooperating parts will now be described.

The upper needle is indicated at 17 and is secured by usual means to a needle bar 18. The needle bar is movably mounted in the head portion 4 and in its present preferred form has movement imparted to it by the following described mechanism. Clamped to the needle bar by means of a yoke member 19a is a curved follower 19 (see Figures 5, 7, 8, and 9). The curved follower is engaged by a roller 20 which is rotatably mounted in the end portion of the cam member 9 by means of a pin 21. When the main drive shaft 5 and cam member 9 are caused to be rotated the roller 20 engaging in the curved follower 19 will cause the needle bar 18 to move between a raised and lowered position. The manner in which the reciprocating motion is imparted to the needle bar is clearly indicated in Figures 7, 8, and 9. Referring to Figure 7 it will be seen that the roller 20 is shown at the time when the needle bar is in its highest raised position. As the shaft 5 and the cam member 9 are rotated in the direction indicated by the arrow in Figure 7 the roller 20 moves downwardly as indicated in Figure 8. As the shaft 5 and cam member continue to rotate, said roller retraces its movement in said follower and thus continues to force the needle bar downwardly until the said roller reaches the position in the follower indicated in Figure 9. The continued rotation of shaft 5 and cam member 9 and the retracting movement of the roller in the follower causes said roller to push the needle bar upwardly until it reaches its original raised position as indicated in Figure 7.

Reciprocally mounted in suitable bearings in the head portion 4 of the machine is a hollow presser foot bar 23 provided with the usual type of presser foot device 22 secured at the lower end thereof by means of the screw bolts 24. The presser foot bar at its upper end has secured thereto an outwardly extending pin 25. The pin 25 extends through the side of the head portion 4 and its end is positioned so that it will engage with a cam member 26 rotatably secured to the head portion as at 27 and which is adapted to be rotated by means of the handle 28. When the cam member is rotated the pin 25 rides over the cam surface of the cam member and causes said presser foot bar to be raised and lowered out of and into operative position with respect to the needle plate 1a. The presser foot bar is normally held in its lowered operative position by means of the spring 29 which has one end secured to the pin 25 and the other end secured to any suitable means, such as is indicated at 30 in Figure 3.

Rotatably mounted in the presser foot bar is a hollow sleeve 31 which encloses a rotatable solid shaft 32. The sleeve 31 and shaft 32 are rotatively supported at their upper ends in suitable bearings in the upper part of the head portion 4. The sleeve 31 is formed with a sliding joint indicated at 33 and which is so positioned that it will permit the presser foot bar to be shifted up and down and to raise and lower the lower end of said sleeve. The solid shaft 32 is also provided with a sliding joint so that the lower end thereof may be shifted up and down with the presser foot bar.

Fixedly secured to the lower end of the hollow sleeve 31 is one upper loop hook 34 of the machine. Secured to the lower end of solid shaft 32 is the second upper loop hook 34a.

At the upper ends of sleeve 31 and shaft 32 there is clamped thereto the forked levers 35 and 36. The levers 35 and 36 are connected to a lever 39 by means of the links 37 and 38. Lever 39 is pivotally mounted by means of a pin 40 between two lugs in the head portion 4 of the machine and is provided with a roller 41 which is positioned so that it engages in the cam race 42 formed in the cam member 9. The cam race 42 is so formed that when the cam member 9 is rotated by the drive shaft 5 it will impart to lever 39 such a movement that said lever through links 37 and 38 will move levers 35 and 36 and impart timed rotative movements to sleeve 31 and shaft 32 so that the loop hooks 34 and 34a will be caused to be opened and closed with respect to each other.

The cam member 9 is also formed with a cam race 43. Cam race 43 is provided to effect the operation of the thread takeup arm 44. The takeup arm is pivotally mounted to the casing as indicated at 45 and has the roller 47 rotatively mounted in one end thereof. The roller 47 is positioned so that it rides in the cam race 43. The other end of the takeup arm is provided with a guide hook for engaging with the thread 48 fed to the needle 17. The thread 48 is fed through the guide 49 (see Figure 2) around tension device 50 and through eyelet in end of lever 44 and thence to the needle. The cam race 43 is so formed that when the cam member 9 is rotated said cam race will impart a timed rocking motion to the thread takeup arm 44 and the thread will thus be fed to the needle at timed intervals.

The mechanism effecting the movements of the lower needle of the machine and its associated and cooperating devices will now be described.

The mechanism employed for imparting the up and down reciprocation of the lower needle is identical with that employed for operating the upper needle. The lower needle is designated 51 and it is suitably mounted at the upper end of the needle bar 52. The needle bar 52 is reciprocally mounted in suitable bearings in the lower casing. Clamped to the needle bar by means of the yoke member 53, in the same manner as was the case in connection with the upper needle bar 18, is the curved follower 54 (see Figure 3). Said curved follower is engaged by the roller 55 which is rotatably secured to the end portion of the cam member 16 by means of a pin similar to the manner in which the roller 20 is secured to cam member 9. When shaft 15 and cam member 16 are rotated, the roller 55 which is engaged in said follower will effect an up and down reciprocation of the needle bar 52 in the same manner as the upper needle bar 18 is reciprocated as above described.

In the casing 56 of the lower portion of the machine there is rotatably mounted in suitable bearings the hollow sleeve 58 which encloses the rotatably mounted solid shaft 59. Fixedly secured to the upper end of the sleeve 58 is one prong 60 of the lower loop hooks of the machine. Fixedly secured to the upper end of solid shaft 59 is the other prong 61 of the lower loop hooks. The lower ends of sleeve 58 and shaft 59 have clamped thereto forked levers 62 and 63 which are identical in character with the levers 35 and 36 connected to the upper sleeve 31 and shaft 32. Links (not shown) but similar in construction and arrangement to the links 37 and 38 connect the levers 62 and 63 with a lever 64. Lever 64 is pivotally mounted at one end in the framework of the lower casing by means of the pin 65 and is also provided with a roller positioned so that it will cooperate in the cam race 67 of the cam member 16. Cam race 67 is so formed that the rotation of the cam head by shaft 15 will cause lever 64 through said links and forked levers 62 and 63 to impart a rotative movement to sleeve 58 and shaft 59 at timed intervals so that the loop hooks 60 and 61 will open and close.

The lower loop hooks 60 and 61 are mounted in a fixed position with respect to the underside of the needle plate 1a and are not moved towards and from said needle plate as is the case with respect to the upper loop hooks which are secured to the sleeve and solid shaft mounted in the presser foot bar.

In the mechanism positioned below the needle plate 1a, in place of a presser foot, there is provided a fabric feeding claw 68. The feeding claw is formed with a serrated edge portion 69 (see Figure 6) which is positioned in the opening 70 in the needle plate. The feeding claw is provided with an opening 71 therein through which the needles 51 and 17 are adapted to pass as they are reciprocated up and down by the above described mechanism. The feeding claw is secured to a lever 72 which is fixedly secured to a shaft 71a. The shaft 71a is secured at one end to the arm 73 which in turn is secured to a shaft 74. When a rotative movement is imparted to shaft 74 it will be seen that the lever 73 will impart a back and forth swinging movement to the shaft 71a thereby reciprocating lever 72 and thus the feeding claw 68 will be caused to be moved back and forth in the opening 70 in the needle plate 1a and the fabric being stitched will thus be progressed along the surface of the said needle plate.

Mechanism is also provided for imparting an up-and-down movement to the feeding claw so that it will grip and release the underside of the fabric during its feeding movement of the same. The mechanism provided for the above-mentioned purpose is as follows:

Extending from shaft 71a, to which the feeding claw 68 is secured, is an arm 76 (see Figure 2). The arm 76 is pivotally secured to a link 77 which in turn is pivotally secured to a lever 78. One end of lever 78 is provided with a roller 79 and the other end is pivotally secured to the framework of the lower casing of the machine. Roller 79 is positioned so that it will register and cooperate with a cam 81 mounted on the shaft 15. When shaft 15 is rotated the cam 81 and roller 79 cause lever 78 to be rocked, and lever 78 through lever 77 and arm 76 imparts a rocking motion to shaft 71a and thus effects a raising and lowering of the feeding claw 68.

The movements of the mechanism above described for effecting the operation of the feeding claw are so timed that the upward movement of the feeding claw for making contact with the fabric is effected immediately before said claw starts its forward movement; it starts downward on completion of the forward stroke effecting the disengagement of the claw from said fabric.

The lower cam member 16 is also provided with a second cam race 82. Cooperating with cam race 82 is a roller 83 pivotally mounted at the end of an arm 84 of a thread takeup lever 85. The thread takeup lever 85 is pivotally mounted by means of the pin 86 to the framework of the lower casing of the machine and at its other end 87 it is provided with a curved slot to receive the thread 88 which is fed to the lower needle 51. When the cam member 16 is rotated by means of shaft 15, the cam race 82 causes roller 83 to impart a rocking motion to the thread takeup lever 85 and to cause said lever to effect the feeding of the thread to said needle at timed intervals and in timed relation with the operation of the other parts of the mechanism associated with the lower needle. The mechanism for feeding the thread to the lower needle 51 is identical with and is operated in identically the same manner as the mechanism for feeding the thread to the upper needle 17.

The means for imparting rotative movements to shaft 74 will now be described.

Referring to Figure 4, it will be noted that a cam 89 is mounted on the main drive shaft 5, said cam being provided with lobes 90 and 91. Cooperating with said cam is a roller 92 which is rotatively mounted at the end of the curved lever 93. Secured in outstanding lugs on the side face of the arm 93 is a rod 94. Slidably mounted on said rod is a sliding block 95 which is secured to the upper end of a rod 96. Rod 96 is pivotally secured at its lower end to the link 97 which in turn is secured to shaft 74. It will be apparent that when the drive shaft 5 is rotated the lobes 90 and 91 on cam 89 will cause lever 93 to be rocked and through the connecting rod 96 and arm 97 the shaft 74 will have imparted thereto periodic rotative movements. The shaft 74 by reason of its operation by the mechanism above referred to will in turn effect the back and forward movements of the feeding claw in the opening provided in the needle plate 1a and thus the fabric being worked upon will be fed along said needle plate. By reason of the two lobes 90 and 91 on cam 89 there will be provided two feeding movements to the feeding claw for each revolution of the drive shaft 5 and consequently the movements of the material through the machine will be twice as fast as is the case in the ordinary sewing machine.

Again referring to Figure 4, it will be noted that a lever 99 is provided which is pivotally secured to the framework 2 of the machine, as at 98. One end 99a of lever 99 extends through the casing and the other end is secured to a link 100. The other end of link 100 is pivotally connected to connecting rod 96. By raising or lowering the end 99a, the rod 96 and its sliding block 95 may be positioned with respect to the rod 94 mounted on lever 93. By adjusting the position of the sliding block 95 with respect to rod 94 variations in the length of the feeding stroke of the feeding claw 68 may be effected and a different length of stitch may be accomplished by the operation of the machine.

Modified mechanism

The modified hook mechanism disclosed in Figures 24 through 31 inclusive is very similar to the hook mechanism already described in detail. It differs mainly in providing the hook mechanism at the front of the needle rather than at the rear. And this is accomplished by having the sleeve 31 and rod 32 in suitable bearings 31a and 31b in the front of the head 4, and by pivoting an arm 39a on a pin 40' at the back of the machine rather than at the front. A ball 32' at the forward end of the presser foot maintains the sleeve and rod in spaced relation to the presser foot and with the sliding joint 33 permits the hooks 34 and 34a to be raised and lowered with the presser foot.

The sleeve 31 and rod 32 have fingers 36 and 35 respectively secured to the upper ends thereof, which in turn through link 37 and lever 39a are given oscillating movements by the cam groove 42a. A similar reversal of the hook mechanism on the underside of the machine is disclosed in Figure 26. Operation of the hooks relative to the reciprocation of the needle is accomplished by suitably locating a lobe 39b with respect to the reciprocation of the needle.

This placement of the hooks is preferred with some forms of stitch. The location of the hooks with respect to the needles when the needles are in line is disclosed in Figure 29, and when the needles are slightly offset relative to each other is disclosed in Figure 30. Also the female type of hooks so far disclosed may be replaced entirely by male type hook 34f as shown in Figure 29 which will be located in advance of the needle and which will move to and beyond the needle in order to form the extended loop.

In practice it has been found that the double hook arrangements hereinbefore described in detail are not absolutely necessary, and that a satisfactory stitch and control of the thread can be effected by merely providing a single finger with a hook adapted to ride into the needle thread. Such a structure is disclosed in Figure 31 and includes a hook 34b with a barb 34c which is swung into the position relative to the needle as shown in Figure 31 whereupon it holds the thread in a looped form as shown when the needle of the thread is returned through the material until the succeeding needle and thread is projected through the loop. After the latter step is accomplished the finger is returned to the inoperative position and the thread loop which is now held by the succeeding needle thread is easily pulled from the barb. The various hook-operating mechanisms previously described in detail serve to move the modified single hook member 34b in the same manner as the double ones are moved. The hook 34b may be secured to either upper or the lower rod or sleeve 31 as by a hub 34d and screw 36e, which rod or sleeve serves to move it into the operative position shown in Figure 31 relative to the needle or to a retracted inoperative position.

Figure 45 is an enlarged and detailed showing of the automatic thread tension, which may be used with the present invention and, in several of the general machines. It comprises a stationary tension plate 150 and movable tension plate 151 on a threaded post 152, the latter being adjustably pressed toward the former by a spring 153 and nut 154. A cross pin 155 engaging with a cam slot 156 on the needle bar and with a cross member 157 in the channel 158 pushes the plate 151 back to relieve and impart the tension on the thread at predetermined times during operation of the machine, such functioning being accomplished by suitably placing raised lobes 159 and depressions 156 on the needle bar 18. A like tension may be provided for the lower needle thread and may be operated by the lower needle bar in like manner.

Figures 32 through 35 inclusive disclose a further modified form of stitching mechanism in which a needle holder chuck 18a has a sliding connection 18b with the needle-operating rod 18 and may be held in various longitudinal positions relative to the line of seam by a screw 18c. A similar adjustment mechanism is provided for the lower needle 51. Thus it is possible to have the needles coaxial or to have the upper needle 17 offset rearwardly or forwardly with respect to the lower needle 51, depending upon the particular stitch formed.

More particularly these Figures 32 to 35 inclusive disclose an advantageous form of modified hook mechanism 100. The upper one will be described first. It includes a slide 101 with a hook 102 adapted to be reciprocated by a gear 103 and rack 104. The slide is preferably mounted for reciprocatory movements in a channel 105 in the presser foot 22 and is held therein with a plate 106. The gear 103 accommodates the sleeve 31 and rod 32 and may be secured and operated by either of these dependent on whether screw 108 or 109 is tightened. Since the rod 32 and sleeve 31 rotate in opposite directions simultaneously the slide 101 and associated hook 102 may be caused to reciprocate forwardly or rearwardly of the machine and line of stitching at the time of needle reciprocation, to project the loop which it picks up from the needle either forwardly or rearwardly thereof dependent upon whether the gear is secured to the rod or to the sleeve.

The hook 102 is mounted for transverse reciprocatory movement in the slide 101 and is held in the retracted position shown in Figure 34 by any suitable spring 102'. A pin at the rear end thereof engages with either bevel 109 or 110 on a plate 111 adjustably secured to the presser bar 22 by any suitable elongated slot and screw connection 112. This latter structure serves to project the thread loop taken by the hook 102 from a point slightly adjacent the needle to a point exactly overlying the general line of stitching to centralize the loop for the next needle and thread projecting through the material. Its use is not absolutely essential since the loop as it lies upon the hook 102 normally extends and clears the field for the reception of the needle and cooperating thread. It may also be dispensed with by having the channel 105 at a slight angle with respect to the line of stitching so that the hook as it is projected moves the loop exactly over the line of stitching. The bevel 109 projects the hook 102 when the slide takes the needle loop and carries its forwardly of the machine or to the right as viewed in Figure 33, and the bevel 110 does likewise when the slide and thread are projected rearwardly or to the left.

The lower thread-hooking mechanism, as shown in Figures 32 and 34, is the same as the upper hook mechanism just described in detail and further reference thereto seems superfluous.

Figure 35 discloses an enlarged showing of the hook 102 which may be shaped somewhat similarly to the pyramidal hook disclosed in Figure 31 and hereinbefore described in detail.

The mechanism just described in detail may be used advantageously to take a loop of thread from either the upper needle 17 or the lower needle 51 and lay loops in an opposed direction on opposite sides of the material, to obtain stitch effects similar to those disclosed in Figures 36, 37, 40, and 44, or by providing a double lobe 39b on the cam as shown in Fig. 25 may be used to lay a thread loop both forwardly and rearwardly with respect to the line of stitching during one rotation of the machine.

This mechanism has a further advantage of making possible loose, medium-tight, and fulltight stitches since it may be used to pull up the stitches in the material to various degrees of tightness; viz., by having the hook 102 retracted a considerable extent from the needle and projected only a short extent after taking the needle thread it will pull up the stitch only slightly; but, when it is normally located somewhat close to the needle and is projected a considerable extent after seizing the needle loop it serves to pull on the previously formed individual stitches in a very taut manner. Such adjustments are accomplished merely by moving the slide 101 to any desired retracted position relative to the needle before tightening either the screw 108 or 109. The various effects and forms of stitches may be further controlled by the tensions and thread-feeding mechanism described in detail hereinbefore.

From the aforegoing it will be apparent that a wide diversity of seam effects may be accomplished with this novel mechanism.

Seam and method of forming

The manner in which the operation of the needles and the other mechanism of the machine effect the formation of a lock stitch will now be explained.

Referring to Figure 12, it will be seen that when the upper needle 17, with its thread 48, is operated so that a downward movement is imparted thereto by the needle bar 18, it is caused to pierce the fabric and to pass through the opening 71 in the feeding claw. As the needle continues on its downward movement (see Figure 13) it passes, with its thread, between the lower loop hooks 60 and 61 which up to this point are maintained in their closed position. As the needle 17 reaches the position indicated in Figure 13 the mechanism which controls the opening and closing of the lower loop hooks causes said hooks to start their opening movement and to grasp the thread held by the upper needle and to spread the same so as to form a loop. This relation of the loop hooks, upper needle and the thread is clearly indicated in Figure 14. Referring to this figure it will be seen that at this point of the operation the needle 17 has started slightly in the direction of its upward movement and there is produced in a loop form a slight slack in the thread and the loop hooks hold the thread in a partially spread condition. In Figures 16 and 17 the upper needle 17 is shown as it has withdrawn further in its upward movement. The lower loop hooks 60 and 61 are shown as having completed their outward movement and are holding the thread which they have grasped from the upper needle in an extended spread condition. At this point, the mechanism which effects the operation of the lower needle 51 has caused said needle to start its upward movement. In Figure 18 the upper needle is shown as having completed its upward movement and the lower needle has been advanced upwardly through the lower loop hooks and the loop held on said hooks. As the lower needle advances upwardly it is to be understood that the mechanism operating the lower loop hooks has caused said hooks to close and to release the loop which they have previously held in extended form. This loop now is drawn tight against the fabric by the take-up arm 44. In Figure 18 the lower needle is also shown as having advanced upwardly through the opening in the feeding claw and has pierced the fabric. It will be noted also that as the lower needle starts its upward movement and the upper needle has left the fabric the mechanism of the machine which effects the operation of the feeding claw has caused said feeding claw to advance the fabric towards the left so that when the lower needle passes through the loop formed of the upper thread and held by the lower loop hooks, the new loop formed by the lower needle will pierce the fabric in advance of the preceding loop.

As the lower needle continues upwardly it passes between the upper loop hooks 33 and 34 which at that time commence their opening movement so as to hold the loop of the thread of the lower needle in an extended spread condition. In Figure 19 there is indicated the position of the lower needle and the loop hooks at the instant when the lower needle starts its receding or downward movement and when the upper loop hooks start their opening movement. In Figure 20 the lower needle is indicated as it has receded below the needle plate and through the opening in the feeding claw with its looped thread held in a spread condition by the upper loop hooks (see Figure 21). In these last two mentioned figures the upper needle is also shown again starting its downward movement and about to pass through the spread loop held by the upper loop hooks. As the upper needle approaches the fabric on the needle plate, the mechanism of the machine which operates the feeding claw again functions and causes said feeding claw to advance the fabric so that the upper needle will pierce the fabric at an advanced point therein. In Figure 22 the upper needle is shown as having passed through the spread loop and carrying the same with it and the upper loop hooks are shown as partially closed. This figure also indicates the advanced fabric with several stitches produced therein by the action of the needles and loop hooks.

The type of stitches formed by the operation of the needles and loop hooks as above described is indicated clearly in Figures 23, 38 and 39. In said figures the upper thread is indicated by the letter A and the lower thread by the letter B.

It is to be understood that the reciprocating movements of the upper and lower needles are effected by their operating mechanisms so that said needles will operate in timed relation with each other and with the opening and closing of the loop hooks. Also the mechanism for effecting the operation of the feeding claw is so constructed and arranged that said feeding claw will raise and lower from the fabric and feed the same along the needle plate in timed relation with the movements of the needles.

Although an alternate operation of the needles, and a feed of the material between each feeding step is disclosed, by having the needles offset relative to each other, as shown in Figures 28 and 32 both may be projected through the material at the same time without interference one by the other, and the only one step of feeding made with each such plural projecting of the needles.

A thread sewing machine made in accordance with my invention has many advantages over usual type of machines which are capable of producing a double thread stitch. In the first place, the machine of the present invention eliminates the use of a bobbin and makes possible the provision of a less expensive and less complicated machine for producing a double thread stitch for joining fabrics. Secondly the rectilinearly alternately reciprocating needles operating in opposite directions provide a greater speed in sewing which is about twice as fast as in the case of the usual bobbin machines. Also the mechanism provided enables the feeding claw to feed the fabric along the needle plate twice as fast as such fabric can be fed in ordinary sewing machines. Furthermore, by utilizing a machine constructed and operating in the manner herein described it is possible to use smaller sizes of thread without danger of breaking because less strain is imposed thereon by reason of the short length of the loops produced by the sewing operations.

In the following description of the seam structure, and in the claims, the terms "surface loop" and "material thickness loop" are used. The term "surface loop" is to indicate a loop, the looped end of which extends substantially along the surface of the material being stitched, while the term "material thickness loop" is to indicate a loop, the looped end of which extends either into or through the material.

Referring to Figures 36 through 44 inclusive which disclose enlarged perspective views of the various forms of stitches and seams provided by the present invention (and in which the large arrow may be representative of the travel or feed of the material when it is made on the sewing machine disclosed), attention is first directed to Figure 39 which discloses a seam 116. This seam is the same as that disclosed in Figure 23, differing therefrom only in that it is an enlarged and perspective showing. It will be seen that the seam is made from an upper thread A and lower thread B, the former being projected downwardly through the material with a loop or surface loop A1 and with the lower thread B projected through the loop A1 and through the material to the opposite side thereof where it is provided with a loop or surface loop B1 laying in the same direction as the opposite surface loop A1 and in which position it is locked by again projecting or drawing the upper thread A through it and into the material for the formation of a succeeding surface loop A1. It will be noted that the threads A and B have straight runs A2 and B2 of double the loop lengths between the points of projection, which in the finished form of the seam take on the appearance of continuous runs of upper and lower threads. A succession of alternate loops A1 and B1 with threads B and A respectively drawn therethrough as just described in detail form a continuous stitched seam which has a neat ornamental appearance and because of the loose tensioning thereof and because of the surface loops serves very satisfactorily on resilient or yielding garments and the like.

The method of forming the seam 116 has been set forth in detail hereinbefore, as formed by the improved apparatus of the present invention, and broadly comprises the steps of: projecting a thread through the material from one side thereof; laying a loop or surface loop A1 along the opposite side of the material; projecting a second thread through the loop and through the material from the opposite side thereof at a slightly spaced point from the other point of projection; laying a loop or surface loop B1 over the surface of the material in the same general direction as the first mentioned loop or surface loop but on the opposite side of the material, and in offset stepped or interspersed relation relative to the first mentioned loop; and then projecting the first thread through the loop or surface loop of the second thread at a slightly spaced point with respect to the point of projection of the second thread through the material. If preferred the method may be conducted with needles travelling back and forth in a substantially stationary area, in which event the process will include the further steps of moving the material one step after the loop A1 is formed and another step after the loop B1 is formed. The seam may be formed either on or off the material.

The seam 117 in Fig. 38 is just like the seam 116 just described in detail, differing only in the degree of tautness imparted to the seam. Various effects may be produced in the seam 117 according to the thickness of the material and the relative closeness of the stitch as is indicated diagrammatically with the seam 118, wherein the thickness of the material, and the space between the stitches is gradually decreased, and if preferred a gradual increase of tensioning also applied, and wherein it will be seen there is in effect almost a single substantially continuous thread on each side of the material with a substantial double loop.

With the latter there is a gradual change from a surface loop A1 and B1 to material thickness loops A3 and B3. The seam with the surface loops A1 and B1 has the characteristic of being resilient and yielding whereas the seam when it has the material thickness loops A3 and B3 loses its elongation and yielding characteristic and makes a substantially locked stitch and one which has the desirable characteristic of not grinning. This latter form is particularly desirable in seams subject to a spreading strain.

Fig. 41 is a view similar to Figs. 38 and 39 just described in detail but shows a seam 120 in which the surface loops A1 and B1 have been pulled back to the point of projection through the material into the form of material thickness loops A3 and B3. Since the loops are wide spaced and there is a considerable run of thread between the step-by-step points of projection of the threads A and B through the material, this seam has the desirable characteristic of being flexible and somewhat yielding but is perhaps rather less capable of elongation than the seam 117. Also it is locked against ravelling more effectively than the seam 116 which is a desirable factor.

Fig. 42 discloses a seam 121 in which the stitches thereof are the same as the seam 120 shown in Fig. 41 but with the threads thereof drawn less taut. This is so formed when it is desirable to have a seam slightly more yielding than the seam 120 shown in Fig. 41 and yet effectively locked against ravelling. The method for forming the seams 120 and 121 is the same as described in detail in connection with the seams 116, 117, and 118.

The drawing in of the material thickness loops A3 and B3 may be accomplished by regular thread tensions on the machine when sewing loose materials or almost automatically by the material itself when sewing hard thick materials. When a slackness is furnished to the threads or when excess thread is hooked out by the thread feeding mechanism hereinbefore described the process will include the further step of drawing in the material thickness loops A3 and B3 subsequent to the passage therethrough of the opposed threads B and A respectively: viz. project thread A through the material; form a loop; project another thread through the loop and through the material from the opposite side of the latter; form a surface loop to the second thread; draw in the surface loop into a material thickness loop; project the first mentioned thread through the surface loop of the second mentioned thread; then draw in the surface loop of the second mentioned thread into a material thickness loop. If preferred the surface loops of both threads may be drawn in at one time instead of successively.

Fig. 43 discloses a seam 122 which is closest to the seams 120 and 121 just described in detail, differing therefrom, mainly in what may preferably be termed half-material thickness loops or half loops A4 and B4 adapted to form associated drawn-in loops A5 and A6 and also drawn-in loops B5 and B6. It is practically impossible to unravel the stitches of the seams 120 through 122 and it may be said that these are verily locked stitches. Also these seams have the advantage of not grinning which makes them particularly desirable in many types of work.

The method of forming the seam 122 is the same as that described in detail in connection with the seams 120 and 121 the only difference being that the material thickness loops are drawn halfway down into the thickness of the material, instead of being left at substantially the same length as the thickness of the material. When so drawn the material thickness loops A4 and B4 draw the continuous runs A7 and B7 down into the material. The latter also greatly strengthens the seam.

The stitches and seams in Figs. 38 through 43 (not 40) have the same appearance on both sides of the material which is desirable in many types of garment or the like.

Fig. 44 shows a slightly modified form of seam 123 in which a combination of material thickness loops B3 and surface loops A1 are used in forming the stitch and seam. This seam is formed by the same steps as the seams 117 and 120, the only difference being that the loop B3 is drawn into the material while the loop A1 lies upon the surface thereof.

Fig. 40 discloses a further modified form of seam 124 which is similar to the seam 117 through the provision of surface loops. However, surface loops in this form of seam run in opposite directions on opposite sides of the work as is clearly apparent in the figure. Further, it will be noted that the seam is formed with short surface loops B8 on one side and with long surface loops A8 on the other side. The steps of forming the seam 124 are as follows: thread B is projected upwardly through the material; a short loop or surface loop B8 is drawn and laid rearwardly on the material; a thread A is projected through loop B and a long surface loop is formed in a direction opposite to the lay of the loop B8, on the other side of the material; the thread B is then projected through the loop A8; a second surface loop B8 is laid upon the other side of the material; and, the thread A is again projected through the last formed loop B8 to the opposite side of the material; and another long loop is then formed.

The seam 125, extension in Fig. 40, is the same as the seam 124 just described in detail differing only in that the points of projection of the threads A and B are close spaced with intermediate wide spaces rather than evenly spaced as disclosed with the seam 124.

It will be noted that this seam will have substantially three threads laying along one side and substantially five threads laying along the other side of the material which may be desirable for ornamental purposes and is accomplished with only two seam forming threads. This stitch and seam is very strong and is effectively locked against ravelling.

Fig. 36 shows a seam 130 which is the same as the seam 124 in Fig. 40 but with the surface loop B8 drawn back to form a full material loop B10.

Fig. 37 discloses a seam 131 similar to the seam 130 of Fig. 36 but shows it formed with half loops B11. The method of forming the seams 130 and 131 is the same as the method of forming seams 120 and 122 respectively as hereinbefore described in detail.

From the foregoing it will be apparent that the present invention discloses a new and very desirable form of stitch and seam, which may be made in a variety of forms for different ornamental and utilitarian effects, which will be satisfactory for all classes of material, which may be effectively locked against ravelling and grinning and has many other desirable advantages. Also that the invention includes a novel method of forming the stitched seam.

The main advantages and features of the invention may be briefly summarized as follows:

(1) The stitch is novel in that it is made by two threads—one thread carried by a needle operating from above, and another thread carried by a needle operating from below, the material.

(2) Co-operating with the needles, are two small loopers, one entering the needle loop of the bottom needle above the work; and the other entering the needle loop of the top needle below the work.

(3) The function and operation of these two loopers transfer the loops from one needle to the other, in the formation of the stitches, which are identical when and if the tension on the needle threads are the same.

(4) The operation of the needles and loopers is so timed that the threads carried by the needles form loops which are concatenated into stitches in a manner requiring a minimum amount of thread and thread take-up action, to draw the stitches tightly into position.

(5) The formation of the stitches may be varied considerably, not only as to length of stitches, but also as to the character of stitch. Stitches may be made that are quite loose, which lie upon both faces of the fabric, on top and bottom—or by change of tension on the threads, stitches made by either needle can be drawn in tight, while stitches made by the other needle can be very loose or partly so. The ideal condition of the stitch formation, however, is to have the loops drawn well into and hidden below the surfaces of the material, so that the concatenation of the needle loops will be below the outside surfaces of the material supporting the stitches.

In order to accomplish this, the machine includes suitable thread nippers, tensions, and short acting take-ups, properly timed to cause the needle loops to vanish during each cycle of stitch formation.

(6) In order to space the stitches, a four-motion feed is employed, the motion of which must be slightly different than the ordinary sewing machine feed motion, because the operation of the needles from above and below the work leaves a shorter period of time for the feed to advance the work in the spacing of the stitches.

(7) The operation of the needles comprises a differential reciprocating motion, in which the needles travel, vertically wtih one another, during a period of the stroke—and away from one another, during another period. That is to say, when the two needles are at their highest position above the work, and also at their lowest position below the work, the points of the two needles almost come together. Then during the upward and downward movement, the points of the needles separate, leaving space between them, at which time, the feed of the material takes place, to space the stitches. It is during this time that the loopers function to transfer the loops from one needle to the other.

(8) A wide variety of forms of the stitch and seam may be made with the one machine; viz.: an elastic or yielding, or an unyielding stitch; the stitch works equally well on thick and thin materials; loose seams with long surface loop may be ravelled, but, when tautened or the surface loops are drawn in the seam is protected against wear and locked against ravelling; etc.

(9) The stitch formation as first mentioned, beginning with the first cycle of stitch formation, may be described as follows:

The needle above the work, being threaded from the reverse side carries a loop of thread through the material, to the under side of the work, where the loop is taken from the needle, by looper hook, and held in position to be entered by the bottom needle as it moves upward. That completes one stitch.

Then the bottom needle continues up through this first stitch, after the work has been advanced with the first stitch, on the looper hook. A loop is projected by the bottom needle above the work for the top looper to enter. This loop is transferred to the top needle on its next descent, immediately after the feed of the work takes place.

Thus we have completed three stitches, two made by the top needle and one by the bottom needle. The feed of the work having shifted three spaces.

(10) Each time a loop is taken from the needle by the loopers, the shifting of the work one stitch length by the feed, opens the loop and carries it into the path of the needle, above and below the work, for the operation of the loopers and needles is the same above the work as below the work. With a single exception, the bottom looper must clear the feed, and for that reason, it is spaced about ¼" below the work, while the top looper operates above the presser foot and is carried up and down with the presser foot as the feeding of the work takes place, whereas the bottom looper is fixed relative to the throat plate and has no up and down movement, as distinguished from the top looper, which not only rises and falls with the presser foot, but is also lifted with the presser foot for removal and placement of the work, whenever that be necessary. The stitching instrumentalities, loopers, needles, feed, throat plate and presser foot, are susceptible to the usual changes in design and engineering specifications to meet different requirements for the sewing trades.

(11) The stitching of thick work, materials of rigid formation, that would resist the pull of the thread in the formation and concatenation of of the stitches, would leave portions of the needle threads which are passed through the material, at right angles to the faces of the material itself. Therefore, the concatenation of the stitches if drawn into the needle holes, made in the material by the needles, would lock the stitches in this position that would offer resistance against ravelling, and also hide the loops where the threads concatenate from abrasion, as the sides of the work come in contact with anything that would cause wear. It would appear that there is better possibility of drawing the concatenation of the stitches well into thick material than there is in hiding the concatenations when the stitches are made on thin materials, but if the threads are fine enough, they may be hidden also, even in the thinnest materials.

(12) When stitching thin materials, with well drawn-in stitches, the appearance of the stitches makes it difficult to find the needle loops, as carried through the material, and transferred from one needle to another. These loops seem to vanish. Perhaps this is because thin material offers little if any, resistance to the needle threads that are passed through the work, in that the thickness of the work may represent not more than five or ten one-thousandths of an inch, whereas the length of the stitch may be fifty or sixty one-thousandths of an inch. From this, we understand that the bulk of the stitch is represented by its length, rather than by its thickness, which is entirely governed by the thickness of the material being stitched, and when the material is very thin, there is no vertical loop extending from one side of the fabric to the other, therefore, the needle loops vanish as the stitches are completed.

This phenomena is entirely due to this new stitch formation, and it is possible that with proper mechanism, in addition to that already described, the concatenation of the needle loops may be drawn through the material completely, to the reverse side, and if that be possible, and could be demonstrated in a practical way, it would prove complete control of the stitch for a wide range of sewed articles.

The terms "stitched seam" or "substantially straight seam" as used herein are intended to define regular straight seams as distinguished from zig-zag, buttonhole, and overedge seams.

Variation and modification may be made within the scope of the present invention, sequence of steps in the methods set forth herein may be altered slightly, and portions of the improvements may be used without others, without departing from the spirit and scope of the present invention.

Having thus described the invention, what is claimed as new is:

1. In a substantially straight seam, the combination with a material, of a thread extending substantially continuously along one side of the material and projected through the material at spaced points, and at the opposite side of the material at said spaced points being of intermittent looped form with the loops extending along the surface of the material; and a second thread extending substantially continuously along the opposite side of the material, and projected through the material at spaced points intermediate the first mentioned spaced points and through the first mentioned loops, and on the opposite side of the material at said spaced points being of intermittent looped form with the loops extending along the surface of the material, contra to the direction of the loops of the first thread, each of said loops of the second thread being secured to the material by the other thread at the points of its projection.

2. In a thread structure the combination, with material, of a pair of threads passed through the material at spaced points from opposite sides thereof and interspersed loops formed by said threads on opposite sides of the material, said loops being in the form of a pair of sets, the set of loops for one thread being laid in one direction on one side of the material and the set of loops of the other thread being laid in the opposite direction and on the opposite side of the material; and the loops on both sides of the material being held in place by the opposite thread at the spaced points where the said opposite thread is projected through the material.

3. The improvement in the art of forming a stitched seam which includes the steps of projecting a thread through the material from one side thereof; extending a long surface loop of said thread along the face of the material and in the general direction of the seam; projecting a second thread through said surface loop and through the material from the opposite side thereof; extending a short surface loop of said second thread along the opposite face of the material and along the line of the seam but in a direction counter to the first surface loop; projecting the first thread through the short surface loop of the second thread and through the long surface loop of the first thread; forming a long surface loop thereon; and projecting the second thread through said last long surface loop.

4. In a thread structure in material, a thread projected through the material and having a long loop extending over the surface of the material; another thread projected through the long loop of the first mentioned thread and through the material, having a short loop superposed on the long loop in a direction counter thereto and at the opposite side of the material; and the first mentioned thread projected through said short and the long loop.

BEULAH LOUISE HENRY.